Nov. 17, 1931. C. H. BRASELTON ET AL 1,831,994
VIBRATION PUMPING MECHANISM
Filed Feb. 1, 1922
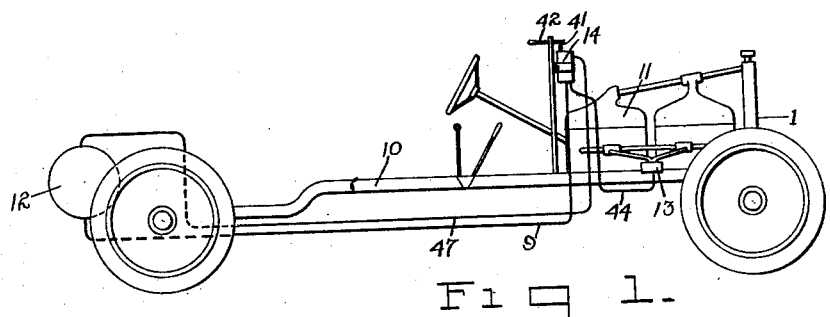

Patented Nov. 17, 1931

1,831,994

UNITED STATES PATENT OFFICE

CHESTER H. BRASELTON, OF NEW YORK, AND FRED B. MacLAREN, OF JAMAICA, NEW YORK; SAID MacLAREN ASSIGNOR TO SAID BRASELTON

VIBRATION PUMPING MECHANISM

Application filed February 1, 1922. Serial No. 533,493.

This invention relates to a system and mechanism for utilizing the relative movements of coacting means actuated by vibration for feeding fuel from a supply tank to a fuel consuming means, such as the charge forming device of a power plant or an internal combustion engine of an automotive vehicle.

A further object of this invention is the provision of liquid fuel pumping mechanism, including relatively movable pumping elements, arranged to function by reason of inertia.

A further object has reference to means for providing an inertia operated fuel feed mechanism of the character indicated which will function throughout a wide range of irregularity of operating force.

A further object in the apparatus herein shown is to combine with the means above mentioned for the pumping of the liquid a receptacle for holding the liquid so pumped until it is used up by the fuel consuming means with means for controlling the pressure of the liquid supplied to the fuel consuming means.

In the embodiment of the mechanism shown and described in this application, we use vibrations such as are caused by a moving vehicle or vehicle standing still, but subjected to vibration by the operation of a driving mechanism or other means, to bring about the lifting of a liquid from a low level such as that of the supply tank of an automobile to a higher level tank from which the liquid fuel for the automobile may be fed as desired by gravity or otherwise to the engine.

Various other objects are within the scope of this invention, such as will appear from the arrangement of the related elements of structures including various details of construction and economies of manufacture, all appearing from the design and operation herein disclosed which shows a form of the invention for a certain application and representing an illustrative preferred embodiment for one useful application of our method and mechanism for broadly utilizing the same.

Figure 1 is a diagrammatic side elevational view of an automobile chassis embodying our invention; and Figure 2 is a central vertical sectional view through the pump and auxiliary high level tank.

Similar reference characters refer to like parts throughout the views.

In the drawings Figure 1 represents diagrammatically an automobile to which our invention is applied, 10 being the automobile frame, 11 an internal combustion engine, 12 a main fuel supply tank, 13 the engine carburetor, and 14 the auxiliary tank from which fuel is permitted to flow to the carburetor as needed, this flow being controlled by the carburetor float of well known construction; not herein shown.

In the present instance we have illustrated a form of our invention in which the pump is mounted within the auxiliary fuel tank, but it should be understood that while this is a convenient compact arrangement with advantages, the auxiliary tank and pump may be entirely separate if desired.

In the embodiment shown, the auxiliary tank includes a cylindrical portion 15 having a lower end 16 and an upper rim 17, both secured to the cylindrical portion 15 by any suitable means. A top 18 is attached to the rim 17, preferaly by means of screws 19. The tank is rigidly connected to some portion of the automobile so as to partake of the vibrations thereof. Preferably it is attached to the forward side of the dash, as illustrated in Figure 1.

The bottom 16 of the tank is provided with a central orifice for the reception of a hollow plug 20 threaded at 21 to receive a nipple connection upon the upper end of a fuel conduit diagrammatically indicated at 9 in Figure 1, leading from the main fuel tank. The plug 20 within the tank is externally threaded to receive the threaded lower end of a pump cylinder 22, by means of which arrangement the pump cylinder is rigidly fixed within the tank.

A passage for fuel through the plug 20 includes a valve chamber 23 and bores 24, the latter being formed in a small plug 25 which is threaded into the upper portion of the larger plug so as to conveniently provide for access to the valve chamber 23. In the latter is mounted an upwardly opening check valve, herein shown as consisting of a ball 27 and spring 28.

The piston of the pump consists primarily of a comparatively heavy element such as a cylindrical iron casting 29, which may be surmounted by a weight 30. The pump chamber 31 is connected with the interior of the auxiliary tank by a suitable passage embodying a check valve. For reasons of convenience in manufacture we have found it desirable to locate this passage largely within the piston itself. To this end we mount upon the lower end of the piston a cap shaped head 32 preferably of relatively soft metal such as brass, which has a snug sliding fit in the pump cylinder 22. Above the head 32 is a cylindrical passage 33 which is closed by a collar 34 also preferably of brass, shrunk onto the portion 29 of the piston. This collar likewise has a sliding fit in the pump cylinder. The cylindrical passage 33 is connected with the pump chamber 31 by angular passages 35, a valve chamber 36 and a central port 37 through the end of the piston head. The port 37 is adapted to be closed by a disc valve 38 as will be readily understood. The cylindrical passage 33 is in free communication with the interior of the auxiliary tank through one or more ports 39. This passage, 33, extends to the top of head 32 and to the periphery of the latter and, by normally retaining some of the liquid fuel, it materially aids in keeping the inner wall of the pump cylinder moist and thereby keeping the pump primed. This priming is further aided, of course, by any liquid fuel contained in the pump chamber, 31. It is to be noted that the outlet, 39, of the pump cylinder is located at some distance above the bottom of the tank, which is very desirable in providing a supply space in the auxiliary tank from which the fuel cannot drain back through the valves of the pump even though the latter are somewhat defective.

The piston is resiliently supported in a predetermined relation with the pump cylinder by a spring 43 bearing at its upper end against the bottom of the weight 30 and at its lower end upon a flange at the bottom of the pump cylinder 22. Attached to the upper end of the piston is a rod 40 which extends through the top 18 of the tank with a comparatively loose fit permitting the passage of air whereby atmospheric pressure is maintained in the top of the tank. This rod 40 may constitute a guide for the piston and also an operating handle by means of which the piston may be manually reciprocated for a purpose to be hereinafter described. The upper end of the rod 40 may have a head 41 by means of which it may be grasped by the operator. If desired, however, a small lever 42 may be mounted in the dash or instrument board of the vehicle as shown in Figure 1, the forward end of the lever being arranged to contact with the head 41 so that the piston may be reciprocated by the driver from his seat.

Connection between the auxiliary tank and the carburetor is had through tubing 44 by gravity feed, the tank 15 being suitably vented to the atmosphere as around the stem 40. The tubing 44 is diagrammatically shown in Figure 1, the upper end of the tubing being attached through the ordinary nipple to a plug 45 fixed in the bottom of the tank by means of a fuel tight joint, said plug extending upwardly above the bottom of the tank for a short distance in order to provide a space for the settlement of sediment, water, or other impurities which may be present in the fuel taken into the tank.

At a suitable height from the bottom of the tank we provide in the wall thereof a perforated plug 46 threaded to receive a nipple (not shown) by means of which the upper extremity of tubing 47 is secured. The opposite end of the latter tubing connects with the main tank as shown in Figure 1.

We have illustrated a fuel supply system embodying our invention and applied to an automobile of usual construction including a chassis frame supported from the wheels and axles by the usual springs. This chassis frame, of course, is under continuous vibration, when the car is in use, due to running over numerous inequalities in the roadbed and to the vibrations set up by the operation of the engine. These vibrations are continuous and usually have a characteristic periodicity depending upon the type of springs, the general construction of the automobile and the design of the motor. In this embodiment, the auxiliary tank and vibration-operated pump is mounted on the chassis frame, being shown as secured to the dash, so that, in effect, the pump is mounted on a vibratory support and partakes of the vibrations of the chassis frame. The pump tank, however, may obviously be mounted on whatever part of the car proves by experiment to be best for the particular car.

The piston of our pump, being quite heavy, has a considerable amount of inertia. Consequently when the vehicle moves upwardly on account of undulations in the road or on account of vibration in the engine, the piston tends to remain at a given height, and consequently the pump cylinder which is rigid with the engine frame moves relatively to the piston thereby tending to compress the liquid in the pump chamber 31. This pressure lifts valve 38 and causes a certain amount of liquid to flow out of chamber 31 through port 37 into valve chamber 36, through passages 35 and 33 and port 39 into the storage space within the tank 14. Descending motion of the vehicle frame causes the pump cylinder to move downwardly while the pump piston tends to remain fixed, and this motion enlarges the chamber 31 thereby producing a partial vacuum which permits the atmospheric pressure in the main tank to lift ball check 27 and cause fluid to flow from the main tank through tubing 9 up into the pump chamber 31. These operations are repeated at rapidly recurring intervals.

In order to guard against any lack of fuel for the engine under the most unfavorable conditions it is desirable to employ a pump cylinder and piston of such diameters that the fuel pumped will be considerably in excess of what is required for ordinary running conditions. On this account we have provided the overflow line 47 to carry all excess fuel back to the main tank 12. Under ordinary running conditions, this overflow line prevents the liquid in the auxiliary tank rising above the overflow part, 46, and thereby limits the pressure under which the fuel feeds from said auxiliary tank to the carburetor or fuel-consuming device of the engine.

When the engine carburetor and the auxiliary tank are empty a supply of fuel sufficient to enable the operator to get the vehicle under way may be pumped into the auxiliary tank by the manual reciprocation of the rod 40 either directly or through the lever 42 on the instrument board.

In order to facilitate repair and replacement of the pump and valve mechanism we form the opening through the rim 17 sufficiently large to permit extraction of the piston with its weight 30, the spring 43 and the pump cylinder, after the top 18 of the tank has been released by the removal of screws 19.

The system and mechanism disclosed in this specification merely constitutes one embodiment of our invention and may be altered and changed considerably without departing from the spirit thereof. Therefore, we claim our invention broadly as indicated by the appended claims.

Having described our invention what we claim is:

1. A device of the class described comprising a receptacle; a cylinder open at one end supported within said receptacle; a piston loosely mounted for reciprocation in said cylinder and protruding from the open end thereof; means to resiliently support said piston for reciprocation by its own inertia; and means to pump liquid fuel from an outside source into said receptacle when said piston is reciprocated.

2. A device of the class described comprising a receptacle; a cylinder open at one end supported within said receptacle; a piston loosely mounted for reciprocation within said cylinder and protruding from the open end thereof; a coil spring surrounding said cylinder and resiliently supporting said piston at a point adjacent its outer end to permit reciprocation of said piston due to its own inertia; and means to pump liquid fuel from an outside source of supply into said receptacle when said piston is reciprocated.

3. A device of the class described comprising a receptacle, a cylinder open at one end supported within said receptacle; a piston mounted for reciprocation within said cylinder protruding from the open end thereof; a spring resiliently supporting said piston to permit reciprocation of said piston with respect to the said cylinder by external vibrations imparted to the cylinder; and an outlet leading from said receptacle, and means whereby liquid may be admitted to the cylinder.

In testimony whereof, we affix our signatures.

CHESTER H. BRASELTON.
FRED B. MacLAREN.

CERTIFICATE OF CORRECTION.

Patent No. 1,831,994. Granted November 17, 1931, to

CHESTER H. BRASELTON ET AL.

It is hereby certified that error appears in the printed specification of the above numbered patent requiring correction as follows: Page 3, line 54, claim 1, and line 64, claim 2, strike out the word "loosely"; and that the said Letters Patent should be read with these corrections therein that the same may conform to the record of the case in the Patent Office.

Signed and sealed this 17th day of May, A. D. 1932.

(Seal)
M. J. Moore,
Acting Commissioner of Patents.